(12) United States Patent
Park

(10) Patent No.: US 10,243,400 B2
(45) Date of Patent: Mar. 26, 2019

(54) WIRELESS POWER TRANSMITTER

(71) Applicant: LG INNOTEK CO., LTD., Seoul (KR)

(72) Inventor: Yu Ri Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 224 days.

(21) Appl. No.: 15/367,945

(22) Filed: Dec. 2, 2016

(65) Prior Publication Data

US 2017/0163091 A1   Jun. 8, 2017

(30) Foreign Application Priority Data

Dec. 3, 2015  (KR) .......................... 10-2015-0171274

(51) Int. Cl.
| | |
|---|---|
| *H02J 50/10* | (2016.01) |
| *H01F 38/14* | (2006.01) |
| *H02J 50/12* | (2016.01) |
| *H02J 50/80* | (2016.01) |

(52) U.S. Cl.
CPC .............. *H02J 50/10* (2016.02); *H01F 38/14* (2013.01); *H02J 50/12* (2016.02); *H02J 50/80* (2016.02)

(58) Field of Classification Search
CPC ...................................................... H02J 50/10

USPC .......................................................... 307/104
See application file for complete search history.

(56) References Cited

U.S. PATENT DOCUMENTS

| | | | |
|---|---|---|---|
| 2014/0070764 A1* | 3/2014 | Keeling ................. | H02J 50/12 320/108 |
| 2014/0197694 A1* | 7/2014 | Asanunna .............. | H01F 38/14 307/104 |
| 2015/0288196 A1* | 10/2015 | Park ....................... | H02J 5/005 307/104 |

FOREIGN PATENT DOCUMENTS

| | | |
|---|---|---|
| KR | 10-2013-0045306 A | 5/2013 |
| KR | 10-2014-0146530 A | 12/2014 |

* cited by examiner

*Primary Examiner* — Joseph Chang
(74) *Attorney, Agent, or Firm* — Birch, Stewart, Kolasch & Birch, LLP

(57) ABSTRACT

Embodiments provide a wireless power transfer technology, and more particularly, provide a wireless power transmitter, which may improve wireless power transfer efficiency, thereby achieving increased performance. The wireless power transmitter includes a Printed Circuit Board (PCB), a first transmission coil attached to a first surface of the PCB, a second transmission coil and a third transmission coil, each attached to a second surface of the PCB so as to overlap the first transmission coil, and a control circuit board for controlling wireless power transfer through the first to third transmission coils.

19 Claims, 8 Drawing Sheets

WIRELESS POWER TRANSMITTER

CROSS REFERENCE TO RELATED APPLICATION

This application claims priority under 35 U.S.C. § 119 to Korean Patent Application No. 10-2015-0171274, filed in Korea on Dec. 3, 2015, which is hereby incorporated in their entirety by reference as if fully set forth herein.

TECHNICAL FIELD

Embodiments relate to a wireless power transfer technology, and more particularly, to a wireless power transmitter, which may improve wireless power transfer efficiency, thereby achieving increased performance.

BACKGROUND

With the recent development of information and communication technology, a ubiquitous society based on information and communication technology has arisen.

In order to enable access to and by information sharing appliances without regard to time or place, sensors, which incorporate computer chips having a communication function therein, need to be installed in all public facilities. Thus, problems related to the supply of power to these appliances or sensors have newly arisen. In addition, as the kinds of portable appliances, such as, for example, mobile phones, Bluetooth handsets, and music players such as iPod, have rapidly increased, the task of charging a battery demands time and effort on the part of the user. As a method to solve this problem, a wireless power transfer technology has recently received attention.

A wireless power transmission (or wireless energy transfer) technology is a technology that wirelessly transfers electricity from a transmitter to a receiver using the principle of induction of a magnetic field. An electric motor or a transformer using the principle of electromagnetic induction has been used since the 1800's, and since that time methods of transferring electricity by emitting electromagnetic waves such as laser or radio waves have been attempted. Electric toothbrushes or some wireless razors that are often used are actually charged based on the principle of electromagnetic induction.

Wireless energy transfer methods that have been achieved thus far may be broadly divided into a magnetic induction method, an electromagnetic resonance method, and an RF transmission method using a short-wavelength radio frequency.

The magnetic induction method is a technology using a phenomenon whereby, when two coils are arranged close to each other and current is applied to one coil, a magnetic flux is generated to generate electromotive force in the other coil, and the commercialization of magnetic induction is quickly progressing in the field of small appliances such as mobile phones. The magnetic induction method may transmit power of a maximum of several hundred kilowatts (kW) and may have high efficiency. However, since the maximum transfer distance is cm or less, an appliance needs to be generally located close to a charger or a substrate.

The electromagnetic resonance method has the feature of using an electric field or a magnetic field, rather than using electromagnetic waves, current or the like. The electromagnetic resonance method is hardly influenced by an electromagnetic wave, and therefore is harmless to other electronic appliances or humans. In contrast, the electromagnetic resonance method may be used at a limited distance and in a limited space, and the energy transfer efficiency thereof is somewhat low.

The short-wavelength wireless power transfer method,—referred to in brief as an RF transmission method,—uses a method of directly transmitting and receiving energy in the form of radio waves. This technology is an RF type wireless power transfer method using a rectenna. "Rectenna" is a portmanteau of "antenna" and "rectifier", and means an element that directly converts RF power into direct current (DC) power. That is, the RF transmission method is a technology of converting alternating current (AC) radio waves into DC radio waves and using DC radio waves. Recently, research into the commercialization of RF transmission has been actively conducted as the efficiency thereof has improved.

Such wireless power transfer technology may be variously used in all industries, such as, for example, IT, rail, and consumer electronics, in addition to the mobile industry.

Recently, in order to increase the rate of recognition of a wireless power receiver put on a charger bed, a wireless power transmitter in which a plurality of coils is mounted has been launched. The coils are formed in multiple layers, and insulation layers are required for electrical disconnection between the multiple layers. At this time, because each of the coils is formed in a Printed Circuit Board (PCB), which is patterned in a spiral structure, the thickness of each of the coils is limited to the thickness of the PCB or less.

The resistance of the coil is increased as the thickness of the coil is reduced, thereby having an effect on the power transfer efficiency of the wireless power transmitter. When the coils mounted in the wireless power transmitter are formed in the PCB, power transfer efficiency may be deteriorated because the thickness of the coils is limited to a predetermined thickness or less. In addition, the price of the PCB is relatively high, which may increase the overall production price of the wireless power transmitter.

SUMMARY

Accordingly, embodiments are devised to solve the problems of the related art described above, and provide a wireless power transmitter.

In addition, embodiments provide a wireless power transmitter, which may increase wireless power transfer efficiency via a reduction in the thickness of a coil.

The technical objects to be accomplished by the embodiments are not limited to the aforementioned technical objects, and other unmentioned technical objects will be clearly understood from the following description by those having ordinary skill in the art.

In one embodiment, a wireless power transmitter includes a Printed Circuit Board (PCB), a first transmission coil attached to a first surface of the PCB, a second transmission coil and a third transmission coil, each attached to a second surface of the PCB so as to overlap the first transmission coil, and a control circuit board for controlling wireless power transfer through the first to third transmission coils.

The first surface may be a surface facing an interface surface on which a wireless power receiver is placed, and the second surface may be a surface at an opposite side of the interface surface.

The first surface may be a surface at an opposite side of an interface surface on which a wireless power receiver is placed, and the second surface may be a surface facing the interface surface.

Each of the first to third transmission coils may be formed by symmetrically etching opposite surfaces of a copper plate.

Each of the first to third transmission coils may be connected to the control circuit board via a connector inserted into the PCB.

The second transmission coil and the third transmission coil may be spaced apart from each other, and an overlapping area between the first transmission coil and the second and third transmission coils may be 50% or more of an entire area of the first transmission coil.

The overlapping area between the first transmission coil and the second and third transmission coils may be 90% or more of the entire area of the first transmission coil.

The connector may be located closest to the first transmission coil, among the first transmission coil, the second transmission coil and the third transmission coil.

In another embodiment, a wireless power transmitter includes a first layer and a second layer each including at least one transmission coil, a PCB having a first surface and a second surface attached to the first layer and the second layer respectively, and a control circuit board for controlling wireless power transfer through the transmission coil.

The embodiments are only some of exemplary embodiments, and various embodiments in which technical features of the embodiments are reflected may be derived and understood based on the following detailed description of the embodiments by those skilled in the art.

BRIEF DESCRIPTION OF THE DRAWINGS

The accompanying drawings are provided to assist in the understanding of the embodiments, and provide the embodiments along with a detailed description. However, the technical features of the embodiments are not limited to particular drawings, and the features illustrated in the respective drawings may be combined with each other so as to configure new embodiments.

Arrangements and embodiments may be described in detail with reference to the following drawings in which like reference numerals refer to like elements and wherein.

DESCRIPTION OF SPECIFIC EMBODIMENTS

Figure 1:
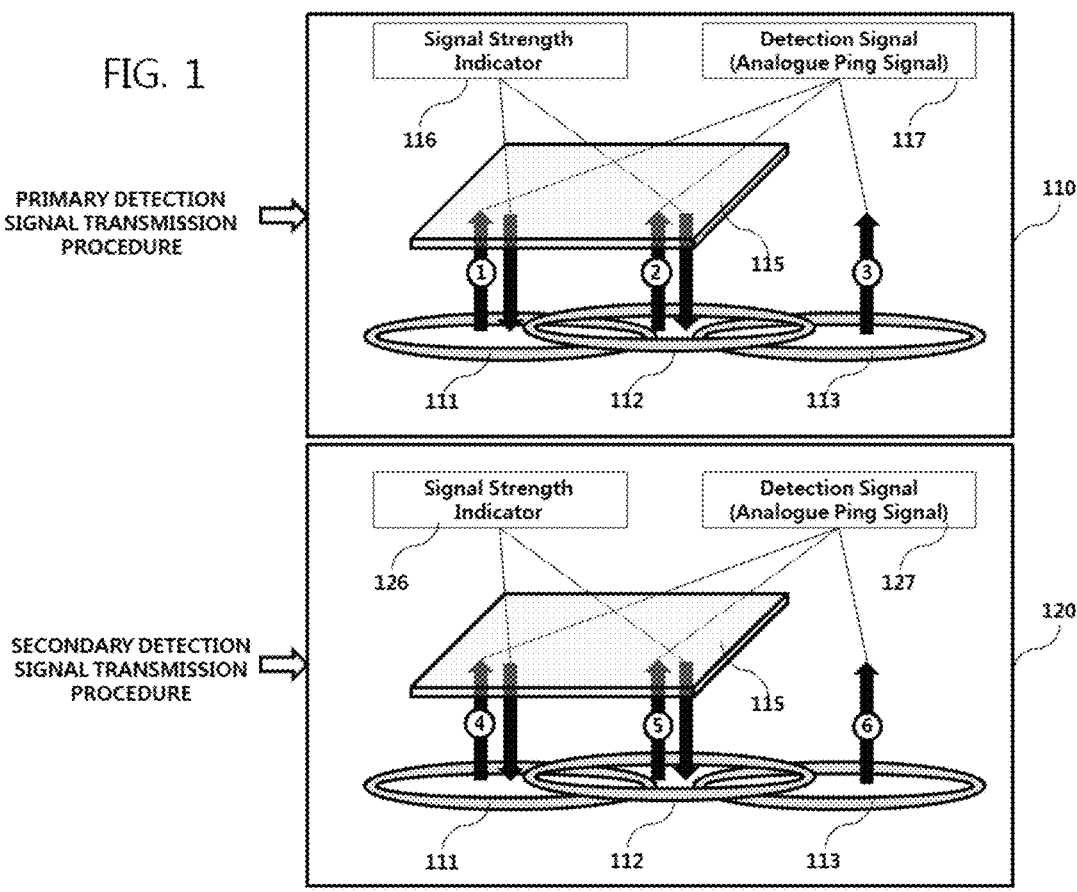
FIG. 1 is a view for explaining a detection signal transmission procedure in a wireless power transmitter according to an embodiment.

Hereinafter, an apparatus and various methods, to which the embodiments are applied, will be described in more detail with reference to the accompanying drawings. The suffixes "module" and "unit" of elements herein are used for convenience of description and thus can be used interchangeably and do not have any distinguishable meanings or functions.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the following description of the embodiments, for convenience of description, an apparatus of wirelessly transmitting power, which configures a wireless power transmission system, may be used interchangeably with a wireless power transmitter, a wireless power transmission apparatus, a transmission terminal, a transmitter, a transmission apparatus, a transmission side, a wireless power transfer apparatus, etc. In addition, for convenience of description, an apparatus for wirelessly receiving power from a wireless power transmission apparatus may be used interchangeably with a wireless power reception apparatus, a wireless power receiver, a receiver, a reception terminal, a reception side, a reception apparatus, etc.

A transmitter according to an embodiment may be configured in the form of a pad, a cradle, an Access Point (AP), a small base station or a stand, and may be of a ceiling-mounted type or a wall-mounted type. One transmitter may transfer power to a plurality of wireless power reception apparatuses. To this end, the transmitter may include at least one wireless power transfer unit. Here, the wireless power transfer unit may use various wireless power transfer standards based on an electromagnetic induction charging method using the principle of electromagnetic induction, in which a power transmission-end coil generates a magnetic field so that electricity is induced in a reception-end coil under the influence of the magnetic field. Here, the wireless power transfer unit may include an electromagnetic induction type wireless charging technology defined by the Wireless Power Consortium (WPC) and the Power Matters Alliance (PMA), which are wireless charging technology standardization organizations.

In addition, a receiver according to an embodiment may include at least one wireless power reception unit, and may wirelessly receive power from two or more transmitters at the same time. Here, the wireless power reception unit may include an electromagnetic-induction-type wireless charging technology that is defined by the Wireless Power Consortium (WPC) and the Power Matters Alliance (PMA), which are wireless charging technology standardization organizations.

The receiver according to the embodiment may be used in small electronic appliances, such as, for example, a mobile phone, a smart phone, a laptop computer, a digital broadcasting terminal, a Personal Digital Assistant (PDA), a Portable Multimedia Player (PMP), a navigation system, an MP3 player, an electric toothbrush, an electronic tag, a lighting apparatus, a remote controller, a float, and a wearable device such as a smart watch, without being limited thereto, and may be used in other various appliances so long as they allow the installation and battery charging of the wireless power reception unit according to the embodiment.

FIG. 1 is a view for explaining a detection signal transmission procedure in a wireless power transmitter according to an embodiment.

Referring to FIG. 1, three transmission coils 111, 112 and 113 may be mounted in the wireless power transmitter. Each transmission coil may overlap at a portion thereof with another transmission coil, and the wireless power transmitter sequentially transmits predetermined detection signals 117 and 127 for detecting the presence of a wireless power receiver (e.g. digital ping signals) in a predefined sequence through each transmission coil.

As illustrated in FIG. 1, the wireless power transmitter may sequentially transmit the detection signals 117 via a primary detection signal transmission procedure designated by reference numeral 110, and may identify the transmission coils 111 and 112 that have received a signal strength indicator 116 from a wireless power receiver 115. Subsequently, the wireless power transmitter may sequentially transmit the detection signals 127 via a secondary detection signal transmission procedure designated by reference numeral 120, may identify one transmission coil that has better power transfer efficiency (or charging efficiency), i.e. that is more closely aligned with a reception coil, among the transmission coils 111 and 112, which have received a signal strength indicator 126, and may perform control for power transfer, i.e. wireless charging, through the identified transmission coil.

As illustrated in FIG. 1, the reason why the wireless power transmitter performs the detection signal transmission procedure two times is to more accurately identify which transmission coil is the most closely aligned with the reception coil of the wireless power receiver.

When the first transmission coil 111 and the second transmission coil 112 have received the signal strength indicators 116 and 126 as illustrated in the blocks designated by reference numerals 110 and 120 of FIG. 1, the wireless power transmitter selects the best-aligned transmission coil based on the signal strength indicator 126 received by each of the first transmission coil 111 and the second transmission coil 112, and performs wireless charging using the selected transmission coil.

Figure 2:
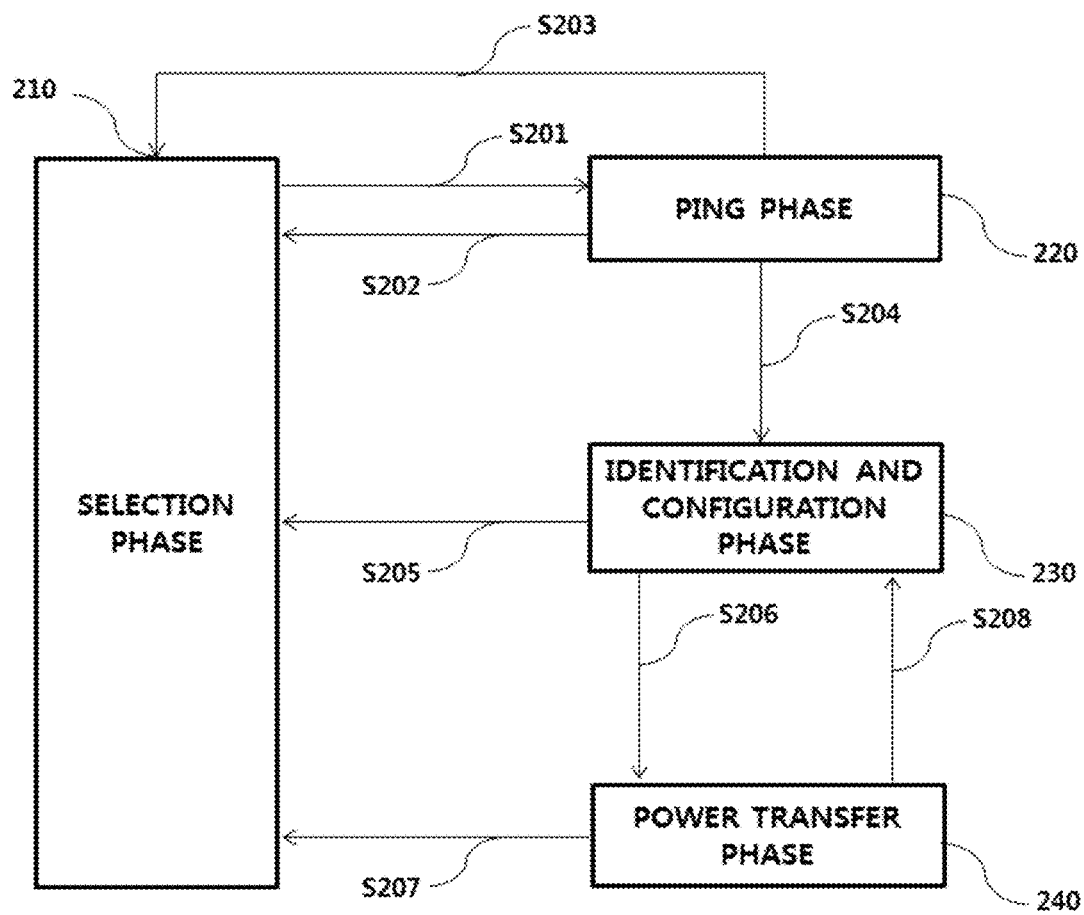
FIG. 2 is a state transition diagram for explaining a wireless power transfer procedure that is defined in the WPC standard.

FIG. 2 is a state transition diagram for explaining a wireless power transfer procedure that is defined in the WPC standard.

Referring to FIG. 2, power transfer from a transmitter to a receiver based on the WPC standard may broadly be divided into a selection phase 210, a ping phase 220, an identification and configuration phase 230, and a power transfer phase 240.

A transmitter may transition to the selection phase 210 when a particular error or a particular event is detected at the time at which power transfer begins or while power transfer is maintained. Here, the particular error and the particular event will become apparent from the following description. In addition, in the selection phase 210, the transmitter may monitor whether an object is present on an interface surface. When the transmitter detects that an object has been placed on the interface surface, the transmitter may transition to the ping phase 220 (S201). In the selection phase 210, the transmitter may transmit an analogue ping signal of a very short pulse, and may detect whether the object is present on the active area of the interface surface based on variation in the current of a transmission coil.

When the presence of the object is detected, in the ping phase 220, the transmitter activates a receiver, and transmits a digital ping signal to identify whether the receiver has compatibility with the WPC standard. When the transmitter receives no response signal with respect to the digital ping signal (e.g. a signal strength indicator) from the receiver in the ping phase 220, the transmitter may again transition to the selection phase 210 (S202). In addition, when the transmitter receives a signal that indicates the completion of power transfer (i.e. an end-of-charge signal) from the receiver in the ping phase 220, the transmitter may also transition to the selection phase 210 (S203).

When the ping phase 220 is completed, the transmitter may transition to the identification and configuration phase 230 for collecting information regarding the identification of the receiver and the configuration and state of the receiver (S204).

When the transmitter receives an unexpected packet or receives no expected packet during a predefined time, when a packet transmission error occurs, or when no power transfer contract is set in the identification and configuration phase 230, the transmitter may transition to the selection phase 210 (S205).

When the identification and configuration for the receiver are completed, the transmitter may transition to the power transfer phase 240 for wireless power transfer (S206).

When the transmitter receives an unexpected packet or receives no expected packet during a predefined time (i.e. a time-out situation), when a violation of a preset power-transfer contract occurs, or when charging ends in the power transmission phase 240, the transmitter may transition to the selection phase 210 (S207).

In addition, the transmitter may transition from the power transfer phase 240 to the identification and configuration phase 230 when it is required to reconfigure a power transfer contract depending on, for example, variation in the state of the transmitter (S208).

The aforementioned power transfer contract may be set based on information regarding the states and properties of the transmitter and the receiver. In one example, the transmitter state information may include information regarding the maximum amount of power that may be transferred and the maximum number of receivers that the transmitter may accommodate, and the receiver state information may include information regarding required power.

Figure 3:
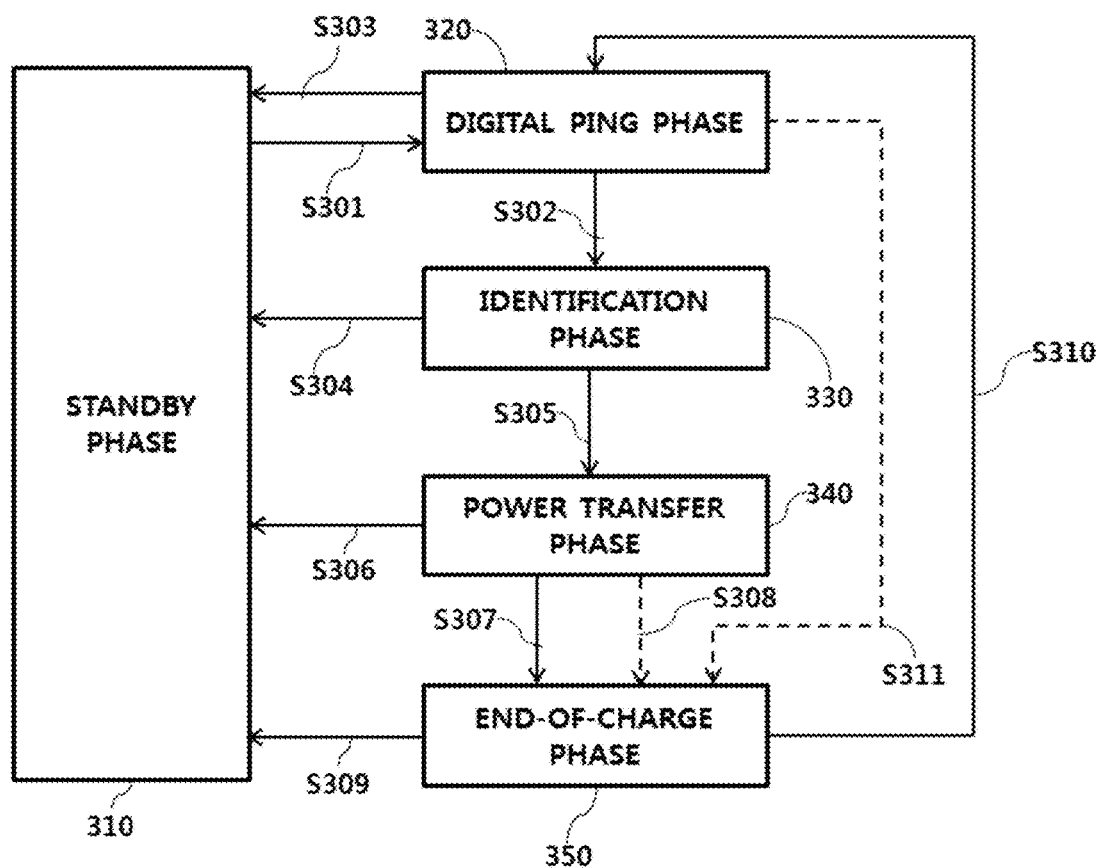
FIG. 3 is a state transition diagram for explaining a wireless power transfer procedure that is defined in the PMA standard.

FIG. 3 is a state transition diagram for explaining a wireless power transfer procedure that is defined in the PMA standard.

Referring to FIG. 3, power transfer from a transmitter to a receiver based on the PMA standard may broadly be divided into a standby phase 310, a digital ping phase 320, an identification phase 330, a power transfer phase 340, and an end-of-charge phase 350.

A transmitter may transition to the standby phase 310 when a particular error or a particular event is detected while a receiver identification procedure for power transfer is performed or while power transfer is underway. Here, the particular error and the particular event will become apparent from the following description. In addition, in the standby phase 310, the transmitter may monitor whether an object is present on a charge surface. When it is detected that an object has been placed on the charge surface or when an RXID retry is underway, the transmitter may transition to the digital ping phase 320 (S301). Here, "RXID" is an inherent identifier assigned to a PMA-capable receiver. In the standby phase 310, the transmitter may transmit an analog ping signal of a very short pulse, and may detect whether an object is present on the active area of the charge surface (e.g. a charger bed) based on variation in the current of a transmission coil.

The transmitter, having transitioned to the digital ping phase 320, transmits a digital ping signal for identifying whether the detected object is a PMA-capable receiver. When sufficient power is supplied to a reception end by the digital ping signal transmitted by the transmitter, the receiver may modulate the received digital ping signal using a PMA communication protocol, thereby transmitting a predetermined response signal to the transmitter. Here, the response signal may include a signal strength indicator, which indicates the strength of power received by the receiver. When receiving an available response signal from the receiver in the digital ping phase 320, the transmitter may transition to the identification phase 330 (S302).

When no response signal is received, or when it is checked that the object is not a PMA-capable receiver (i.e. a Foreign Object Detection (FOD) situation) in the digital ping phase 320, the transmitter may transition to the standby phase 310 (S303). In one example, the Foreign Object (FO) may be a metallic object including, for example, a coin or a key.

In the identification phase 330, when a receiver identification procedure has failed or needs to be performed again, or when the receiver identification procedure does not end within a predefined time, the transmitter may transition to the standby phase 310 (S304).

When receiver identification succeeds, the transmitter may transition from the identification phase 330 to the power transfer phase 340 so as to initiate charging (S305).

In the power transfer phase 340, when the transmitter receives no expected signal within a predetermined time (i.e. a time-out situation) or detects an FO, or when the voltage of a transmission coil exceeds a predefined reference value, the transmitter may transition to the standby phase 310 (S306).

In addition, in the power transfer phase 340, when the temperature sensed by a temperature sensor mounted in the transmitter exceeds a predetermined reference value, the transmitter may transition to the end-of-charge phase 350 (S307).

In the end-of-charge phase 350, when it is checked that the receiver is removed from the charge surface, the transmitter may transition to the standby phase 310 (S309).

In addition, when the temperature measured after a predetermined time has passed becomes a reference value or less in an over-temperature state, the transmitter may transition from the end-of-charge phase 350 to the digital ping phase 320 (S310).

In the digital ping phase 320 or the power transfer phase 340, the transmitter may transition to the end-of-charge phase 350 when receiving an End of Charge (EOC) request from the receiver (S308 and S311).

Figure 4:
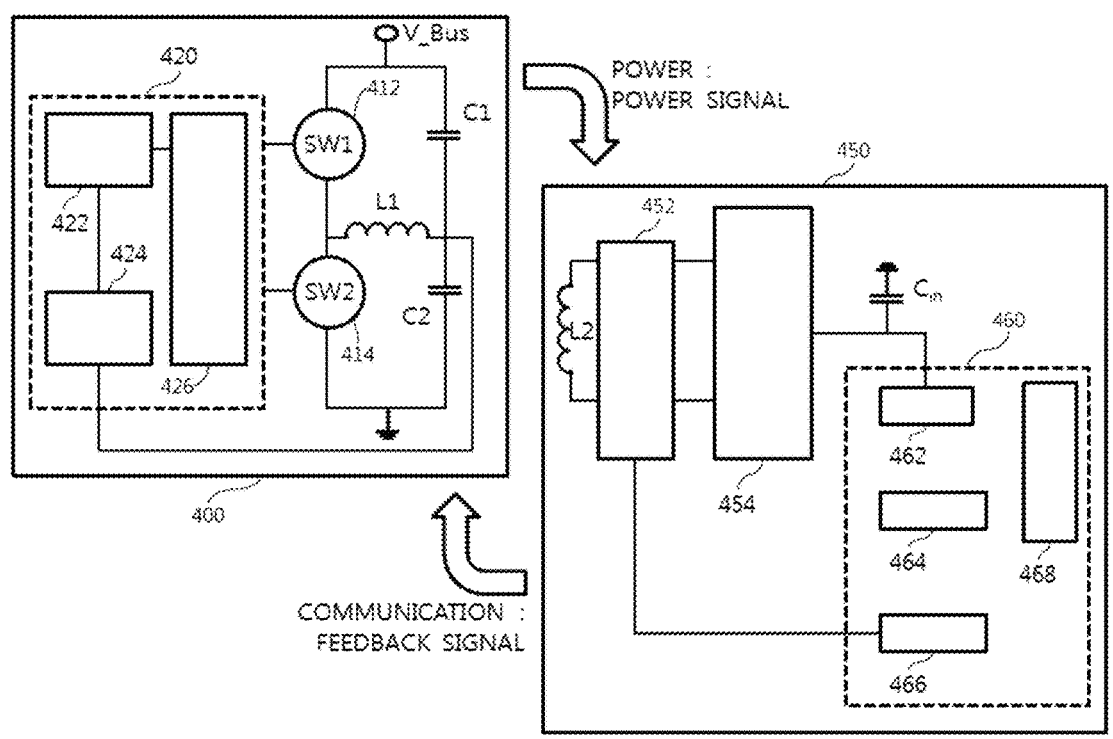
FIG. 4 is a view for explaining an electromagnetic-induction-type wireless charging system according to an embodiment.

FIG. 4 is a view for explaining an electromagnetic-induction-type wireless charging system according to an embodiment.

Referring to FIG. 4, the electromagnetic-induction-type wireless charging system includes a wireless power transmitter 400 and a wireless power receiver 450. The wireless power transmitter 400 and the wireless power receiver 450 are respectively substantially the same as the wireless power transmitter and the wireless power receiver described with reference to FIG. 1.

When an electronic appliance including the wireless power receiver 450 is located on the wireless power transmitter 400, coils of the wireless power transmitter 400 and the wireless power receiver 450 may be coupled to each other by an electromagnetic field.

The wireless power transmitter 400 may modulate a power signal and change a frequency in order to generate an electromagnetic field for power transfer. The wireless power receiver 450 may receive power by demodulating an electromagnetic signal depending on a protocol that is set so as to be suitable for a wireless communication environment, and may transmit a predetermined feedback signal, which is used to control the strength of power to be transferred from the wireless power transmitter 400 based on the strength of received power, to the wireless power transmitter 400 via in-band communication. In one example, the wireless power transmitter 400 may increase or reduce the amount of power to be transferred by controlling an operational frequency in response to a control signal for power control.

The amount of power to be transferred (or an increase/reduction in the amount of power) may be controlled using the feedback signal, which is transmitted from the wireless power receiver 450 to the wireless power transmitter 400. In addition, communication between the wireless power receiver 450 and the wireless power transmitter 400 is not limited only to the aforementioned in-band communication using the feedback signal, but may be performed using out-of-band communication by a separate communication module. For example, a module for near-field wireless communication, such as Bluetooth, Bluetooth Low Energy (BLE), NFC, or ZigBee, may be used.

In electromagnetic induction, a frequency modulation method may be used in a protocol for the exchange of state information and control signals between the wireless power transmitter 400 and the wireless power receiver 450. Apparatus identification information, charging state information, power control signals, and the like may be exchanged via the protocol.

The wireless power transmitter 400 according to an embodiment, as illustrated in FIG. 4, may include a signal generator 420 for generating a power signal, a coil L1 and capacitors C1 and C2, which are located between voltage supply ends V_Bus and GND, which may sense the feedback signal transmitted from the wireless power receiver 450, and switches SW1 and SW2, the operation of which is controlled by the signal generator 420. The signal generator 420 may include a demodulator 424 for the demodulation of the feedback signal transmitted through the coil L1, a frequency drive unit 426 for frequency change, and a transmission controller 422 for controlling the demodulator 424 and the frequency drive unit 426. The feedback signal, transmitted through the coil L1, is demodulated by the demodulator 424, and thereafter is input to the transmission controller 422. The transmission controller 422 may control the frequency drive unit 426 based on the demodulated signal, thereby changing the frequency of the power signal to be transmitted to the coil L1.

The wireless power receiver 450 may include a modulator 452 for transmitting the feedback signal through the coil L2, a rectifier 454 for converting an Alternating Current (AC) signal, received through the coil L2, into a Direct Current (DC) signal, and a reception controller 460 for controlling the modulator 452 and the rectifier 454. The reception controller 460 may include a voltage supply unit 462 for supplying a voltage required for the operation of the rectifier 454 and other constituent elements of the wireless power receiver 450, a DC-DC transformer 464 for changing a DC voltage output from the rectifier 454 to a DC voltage that satisfies the charging requirement of a charging object (e.g., a load), the load 468 to which the converted voltage is output, and a feedback communication unit 466 for generating a feedback signal, which is used to provide the wireless power transmitter 400 with, for example, information regarding the state of received power and the state of the charging object.

In FIG. 4, although the coil L1, included in the wireless power transmitter 400, means the three transmission coils 111, 112 and 113 illustrated in FIG. 1, and the switches SW1 and SW2 and the capacitors C1 and C2, connected to the transmission coils 111, 112 and 113, may be provided on each transmission coil 111, 112 or 113, the scope of the disclosure is not limited thereto.

Figure 5:
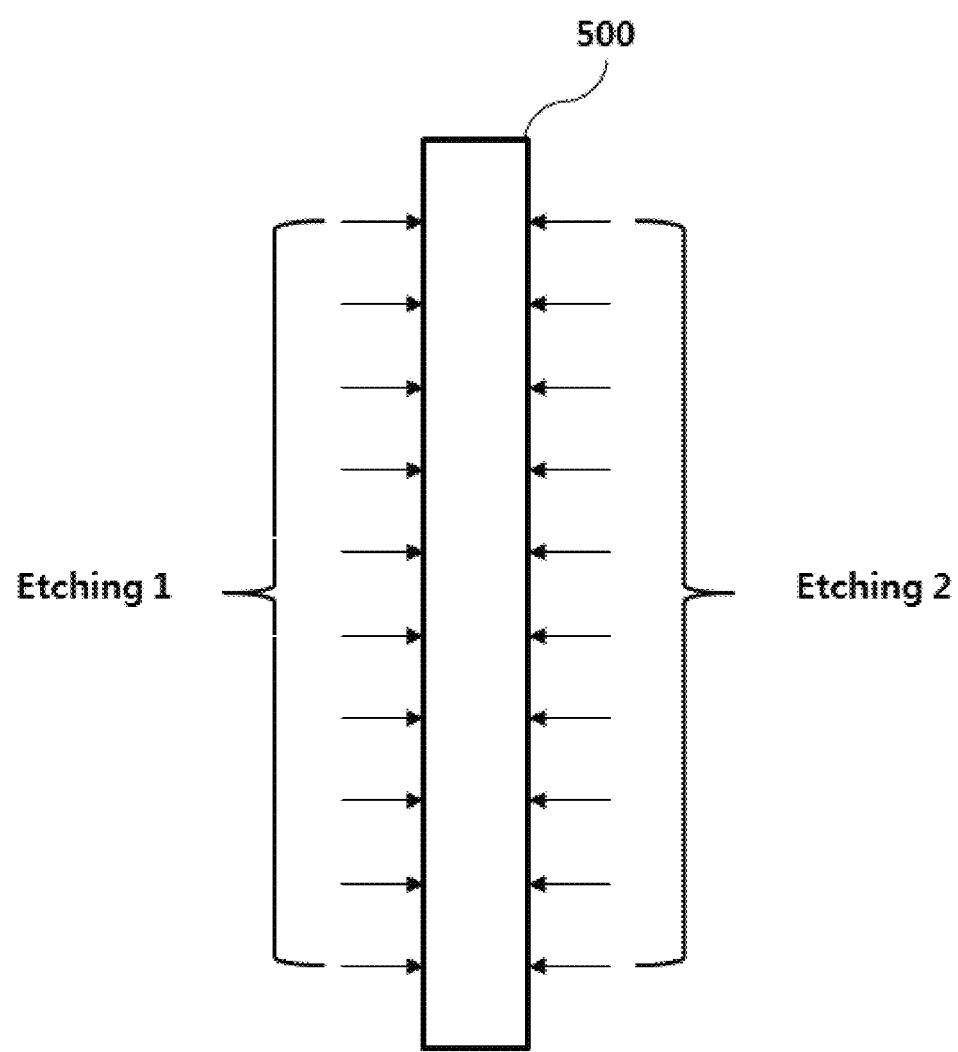
FIG. 5 is a view for explaining a method of manufacturing a transmission coil according to an embodiment.
Figure 6:
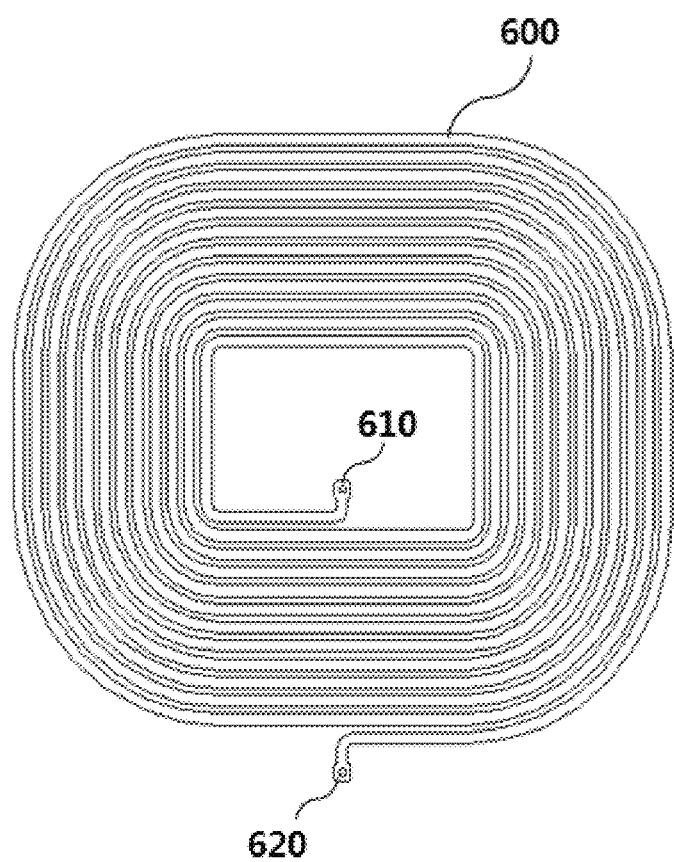
FIG. 6 is a front view of a transmission coil according to an embodiment.

FIG. 5 is a view for explaining a method of manufacturing a transmission coil according to an embodiment. FIG. 6 is a front view of a transmission coil according to an embodiment.

Referring to FIGS. 5 and 6, a copper plate 500 may be formed of copper (Cu). The copper plate 500 may be thicker than a general PCB.

First etching "Etching 1" and second etching "Etching 2" may be performed on opposite surfaces of the copper plate 500. The first etching "Etching 1" and the second etching "Etching 2" are etching processes performed in various shapes of patterns including, for example, a concentric spiral structure, a rectangular structure, or an octagonal structure, and may be symmetrically performed on opposite surfaces of the copper plate 500.

FIG. 6 illustrates a coil 600 manufactured by performing the first etching "Etching 1" and the second etching "Etching 2" on the copper plate 500. Although the coil 600 is illustrated as having a concentric rectangular structure, the scope of the disclosure is not limited thereto. The first etching "Etching 1" and the second etching "Etching 2" may be performed at the same time or in sequence.

A first terminal 610 may be formed on the inner end of the coil 600, and a second terminal 620 may be formed on the outer end of the coil 600. The first terminal 610 and the second terminal 620 may correspond to both ends of the coil L1 illustrated in FIG. 4, and may be connected to a control circuit board. The control circuit board may be a board including elements for controlling the operation of the wireless power transmitter 400, such as, for example, the switches SW1 and SW2 and the signal generator 420, and may be connected to the coil 600 via connectors 720 and 920 illustrated in FIGS. 7 to 10.

Figure 7:
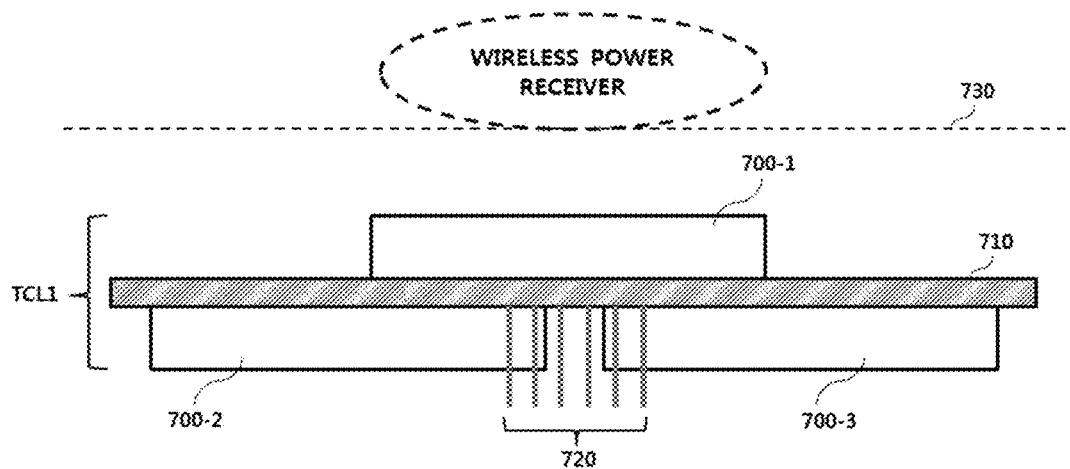
FIG. 7 is a view for explaining a method of manufacturing a transmission coil layer according to an embodiment.
Figure 8:
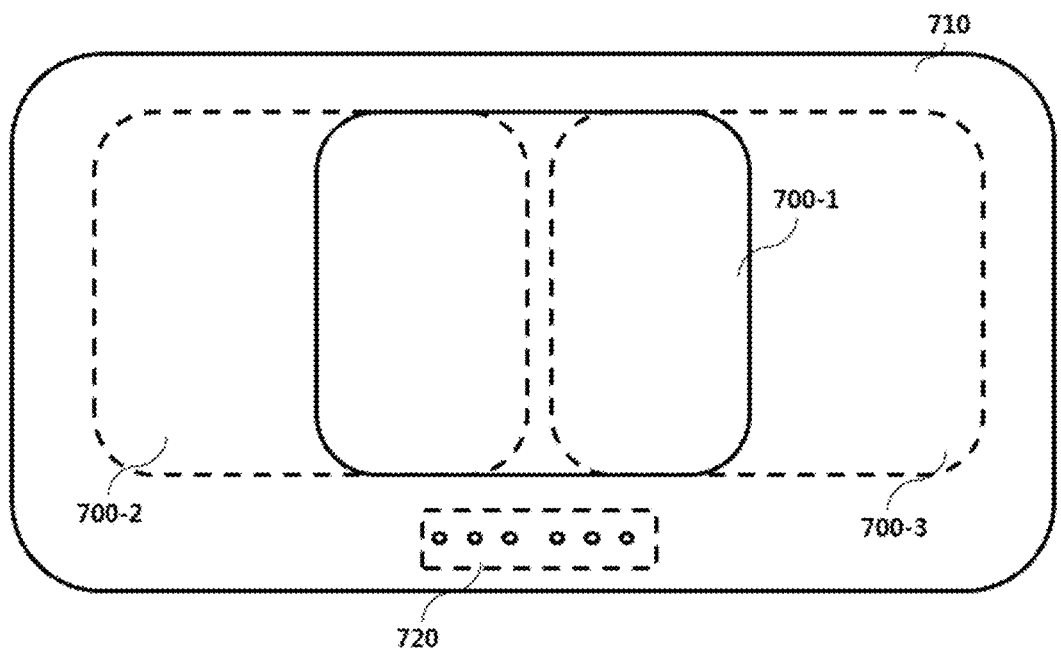
FIG. 8 is a front view of the transmission coil layer illustrated in FIG. 7.

FIG. 7 is a view for explaining a method of manufacturing a transmission coil layer according to an embodiment. FIG. 8 is a front view of the transmission coil layer illustrated in FIG. 7.

Referring to FIGS. 7 and 8, a transmission coil layer TCL1 may include first to third coils 700-1 to 700-3 and a PCB 710.

The first to third coils 700-1 to 700-3 may be configured respectively as the coil 600 illustrated in FIG. 6, and may overlap each other so as to prevent the generation of a dead spot in which charging is impossible as the result of areas in which wireless charging is possible being completely separated from each other.

In particular, the second coil 700-2 and the third coil 700-3 may be spaced apart from each other, and may be arranged so that the area of the first coil 700-1 that overlaps the second coil 700-2 and the third coil 700-3 is 50% or more of the entire area of the first coil 700-1, in order to prevent the generation of a dead spot.

In some embodiments, the area of the first coil 700-1 that overlaps the second coil 700-2 and the third coil 700-3 may be 90% or more of the entire area of the first coil 700-1.

The PCB 710 may function to electrically separate the coil 700-1 on the top thereof from the coils 700-2 and 700-3 on the bottom thereof.

The first coil 700-1 may be affixed to a first surface of the PCB 710 via adhesion, and the second coil 700-2 and the third coil 700-3 may be affixed to a second surface of the PCB 710 via adhesion.

The first surface is one surface of the PCB 710, and as illustrated in FIG. 7, corresponds to the surface that is closer to (or faces) an interface surface 730 on which the wireless power receiver may be placed. In contrast, the second surface corresponds to the other surface of the PCB 710, i.e. the surface at the opposite side of the first surface, and as illustrated in FIG. 7, corresponds to the surface that is farther from the interface surface 730 on which the wireless power receiver may be placed.

In other words, assuming that a layer including the first coil 700-1 is a first layer, a layer including the second coil 700-2 and the third coil 700-3 is a second layer, and a layer including the PCB 710 is an intermediate layer, the first layer may be attached to the first surface of the intermediate layer and the second layer may be attached to the second surface of the intermediate layer.

Although a method of attaching the coil 700-1 on the top of the PCB 710 and attaching the coils 700-2 and 700-3 on the bottom of the PCB 710 may include, for example, a method using a separate adhesive sheet or a method of applying a synthetic resin having adhesive and insulating properties, the scope of the disclosure is not limited thereto.

In terms of time, although, after the respective coils 700-1 to 700-3 are formed, the coils 700-1 to 700-3 may be attached to the PCB 710, and the sequence of attachment of the coils 700-1 to 700-3 may be such that attachment to the first surface is first and attachment to the second surface is next, the scope of the disclosure is not limited thereto.

A connector 720, which may allow the top coil 700-1 and the bottom coils 700-2 and 700-3 to be connected respectively to the control circuit board, may be inserted into the second surface of the PCB 710. First terminals and second terminals of the respective coils 700-1 to 700-3 may be respectively connected to at least six terminals of the connector 720, and the at least six terminals may be connected to the control circuit board.

The control circuit board may be formed below the coils 700-2 and 700-3, and a barrier may be formed between the control circuit board and the coils 700-2 and 700-3 in order to prevent the passage of an electric field and a magnetic field.

FIG. 8 is a front view illustrating the transmission coil layer TCL1 viewed from the front side (i.e. from the interface surface 730).

The top coil 700-1 and the bottom coils 700-2 and 700-3 may overlap each other so as to prevent the generation of a dead spot. The arrangement of the top coil 700-1 and the bottom coils 700-2 and 700-3 may be altered in various ways so long as they overlap each other.

The connector 720 may be inserted into the PCB 710 such that it does not overlap the top coil 700-1 or the bottom coils 700-2 and 700-3.

With the wireless power transmitter including the transmission coil layer TCL1 according to the embodiment, each coil may be thick, thus having reduced resistance. Thereby, greater power may be wirelessly transferred under the condition of the same power consumption, and the Quality factor (Q factor) of the wireless power transmitter may be improved.

Figure 9:
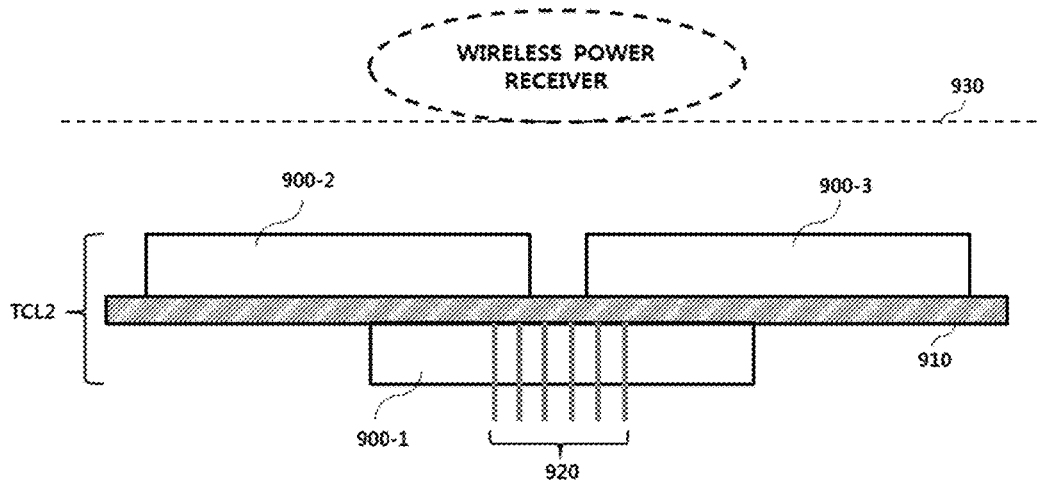
FIG. 9 is a view for explaining a method of manufacturing a transmission coil layer according to another embodiment.
Figure 10:
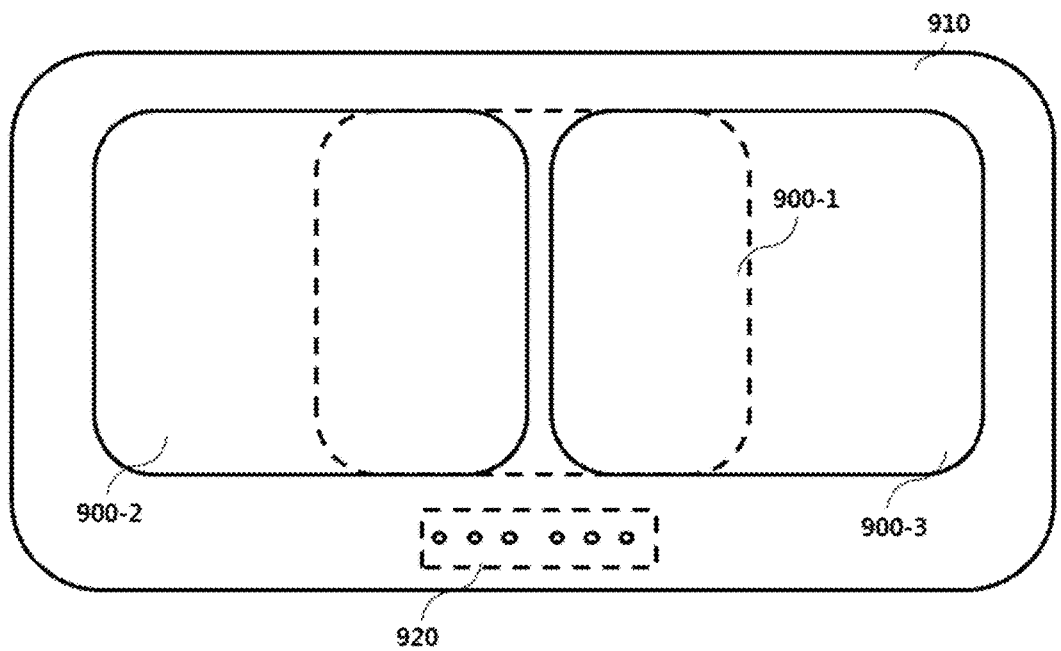
FIG. 10 is a front view of the transmission coil layer illustrated in FIG. 9.

FIG. 9 is a view for explaining a method of manufacturing a transmission coil layer according to another embodiment. FIG. 10 is a front view of the transmission coil layer illustrated in FIG. 9.

Referring to FIGS. 9 and 10, a transmission coil layer TCL2 may include first to third coils 900-1 to 900-3 and a PCB 910.

The first to third coils 900-1 to 900-3 may be configured respectively as the coil 600 illustrated in FIG. 6, and may overlap each other so as to prevent the generation of a dead spot in which charging is impossible as the result of areas in which wireless charging is possible being completely separated from each other.

The PCB 910 may function to electrically separate the coils 900-2 and 900-3 on the top thereof from the coil 900-1 on the bottom thereof.

The second coil 900-2 and the third coil 900-3 may be affixed to a first surface of the PCB 910 via adhesion, and the first coil 900-1 may be affixed to a second surface of the PCB 910 via adhesion.

The first surface is one surface of the PCB 910, and as illustrated in FIG. 9, corresponds to the surface that is closer to (or faces) an interface surface 930 on which the wireless power receiver may be placed. In contrast, the second surface corresponds to the other surface of the PCB 910, i.e. the surface at the opposite side of the first surface, and as illustrated in FIG. 9, corresponds to the surface that is farther from the interface surface 930 on which the wireless power receiver may be placed.

That is, in the transmission coil layer TCL2 of FIG. 9, two transmission coils 900-2 and 900-3 are located at the side close to the interface surface 930, and one transmission coil 900-1 is located at the side distant from the interface surface 930.

In other words, assuming that a layer including the second coil 900-2 and the third coil 900-3 is a first layer, a layer including the first coil 900-1 is a second layer, and a layer including the PCB 910 is an intermediate layer, the first layer may be attached to the first surface of the intermediate layer and the second layer may be attached to the second surface of the intermediate layer.

Although a method of attaching the coils 900-2 and 900-3 on the top of the PCB 910 and attaching the coil 900-1 on the bottom of the PCB 910 may include, for example, a method using a separate adhesive sheet or a method of applying a synthetic resin having adhesive and insulating properties, the scope of the disclosure is not limited thereto.

At this time, although it is natural to locate one coil on the top of the PCB 910 and two coils on the bottom of the PCB 910, the arrangement of the present embodiment (i.e. the arrangement of two coils on the top) has no negative effect on physical stability because the respective coils are attached to the PCB 910.

In terms of time, although, after the respective coils 900-1 to 900-3 are formed, the coils 900-1 to 900-3 may be attached to the PCB 910, and the sequence of attachment of the coils 900-1 to 900-3 may be such that attachment to the first surface is first and attachment to the second surface is next, the scope of the disclosure is not limited thereto.

A connector 920, which may allow the top coils 900-2 and 900-3 and the bottom coil 900-1 to be connected respectively to the control circuit board, may be inserted into the second surface of the PCB 910. First terminals and second terminals of the respective coils 900-1 to 900-3 may be respectively connected to at least six terminals of the connector 920, and the at least six terminals may be connected to the control circuit board. The respective terminals of the connector 920 may be located closest to the first coil 900-1 among the coils 900-1 to 900-3.

The control circuit board may be formed below the coil 900-1, and a barrier may be formed between the control circuit board and the coil 900-1 in order to prevent the passage of an electric field and a magnetic field.

FIG. 10 is a front view illustrating the transmission coil layer TCL2 viewed from the front side (i.e. from the interface surface 930).

The top coils 900-2 and 900-3 and the bottom coil 900-1 may overlap each other so as to prevent the generation of a dead spot. The arrangement of the top coils 900-2 and 900-3 and the bottom coil 900-1 may be altered in various ways so long as they overlap each other.

The connector 920 may be inserted into the PCB 910 such that it does not overlap the top coils 900-2 and 900-3 or the bottom coil 900-1.

With the wireless power transmitter including the transmission coil layer TCL2 according to the embodiment, each coil may be thick, thus having reduced resistance. Thereby, greater power may be wirelessly transferred under the condition of the same power consumption, and the Quality factor (Q factor) of the wireless power transmitter may be improved.

In addition, the respective transmission coils 900-1 to 900-3 transmit the detection signals 117 and 127 described with reference to FIG. 1 in the standby mode. In order to realize the same reception sensitivity of the detection signals 117 and 127 on the basis of the interface surface 930, the voltage applied to the transmission coils 900-2 and 900-3, which are closer to the interface surface 930, and the voltage applied to the transmission coil 900-1, which is farther from the interface surface 930, are different. That is, because the sensitivity of a signal is reduced as the transfer distance is increased, the voltage applied to the transmission coil 900-1 may be higher than the voltage applied to the transmission coils 900-2 and 900-3.

Accordingly, when the two coils 900-2 and 900-3 are arranged on the top as illustrated in FIG. 9, the number of coils, to which a high voltage needs to be applied, is reduced, which may reduce total power consumption for the transfer of detection signals.

The distance between the respective transmission coils 900-1 to 900-3 and the interface surface 930 is associated with the power transfer efficiency of the respective transmission coils 900-1 to 900-3 due to a reduction in the sensitivity of a signal between the respective transmission coils 900-1 to 900-3 and the interface surface 930.

That is, the power transfer efficiency may be increased as the distance between the respective transmission coils 900-1 to 900-3 and the interface surface 930 is reduced. In the embodiment of FIG. 9, the number of the transmission coils 900-2 and 900-3, which are closer to the interface surface 930, is greater than the number of the transmission coils (e.g. the transmission coil 900-1), which are farther from the interface surface 930, which may increase total power transfer efficiency.

Accordingly, with the wireless power transmitter including the transmission coil layer TCL2 according to the embodiment, power consumption for the transfer of detection signals may be reduced, and power transfer efficiency may be increased.

The effects of the wireless power transmitter according to the embodiments will be described below.

With the wireless power transmitter according to one embodiment, each coil may be thick, thus having a reduced resistance. This enables the wireless transmission of greater power under the condition of the same power consumption, and may improve the Quality factor (Q factor) of the wireless power transmitter.

In addition, with the wireless power transmitter, power consumption for the transmission of detection signals may be reduced, which may result in increased power transmission efficiency.

The effects to be accomplished by the embodiments are not limited to the aforementioned effects, and other unmentioned effects will be clearly understood from the above description by those having ordinary skill in the art.

The method according to the above-described embodiment may be implemented as a program that is to be executed in a computer and may be stored in a computer-readable recording medium, and examples of the computer-readable recording medium may include a ROM, a RAM, a CD-ROM, a magnetic tape, a floppy disc, and an optical data storage device. In addition, the computer readable recording medium is implemented in a carrier wave (e.g., data transmission over the Internet).

The computer-readable recording medium may be distributed in a computer system connected thereto via a network so that a computer-readable code may be stored and executed in a distributed manner. In addition, functional programs, codes, and code segments for realizing the above-described method may be easily deduced by programmers skilled in the art related to the embodiment.

It will be clearly understood by those skilled in the art that the embodiments may be realized in other particular forms within a range that does not deviate from the spirit and essential features of the embodiments.

Accordingly, the above detailed description should not be construed as being limited in all terms, but should be considered to be exemplary. The scope of the embodiments should be determined by the reasonable interpretation of the accompanying claims, and all changes that fall within the range equivalent to the embodiments should be understood as belonging to the scope of the embodiments.

What is claimed is:

1. A wireless power transmitter comprising:
   a Printed Circuit Board (PCB);
   a first transmission coil attached to a first surface of the PCB;
   a second transmission coil and a third transmission coil, each attached to a second surface of the PCB opposite to the first surface, both of the second and third transmission coils overlapping with the first transmission coil; and
   a control circuit board for controlling wireless power transfer through the first to third transmission coils,
   wherein the second transmission coil is spaced apart from the third transmission coil by a middle area without overlapping with the third transmission coil,
   wherein the first transmission coil overlaps with the middle area and portions of the second and third transmission coils, and
   wherein the control circuit board is configured to:
      individually select an aligned coil among the first, second and third transmission coils for transmitting wireless power, and
      control the aligned coil to transmit the wireless power without transmitting the wireless power via two unselected coils among the first, second and third transmission coils.

2. The wireless power transmitter according to claim 1, wherein the first surface is a surface facing an interface surface on which a wireless power receiver is placed, and wherein the second surface is a surface at an opposite side of the interface surface.

3. The wireless power transmitter according to claim 1, wherein the first surface is a surface at an opposite side of an interface surface on which a wireless power receiver is placed, and
   wherein the second surface is a surface facing the interface surface.

4. The wireless power transmitter according to claim 1, wherein each of the first to third transmission coils is formed by symmetrically etching both surfaces of a copper plate, and
   wherein each of the first to third transmission coils is thicker than the PCB.

5. The wireless power transmitter according to claim 1, wherein each of the first to third transmission coils is connected to the control circuit board via a connector inserted into the PCB.

6. The wireless power transmitter according to claim 1, wherein the second transmission coil and the third transmission coil are spaced apart from each other, and
   wherein an overlapping area between the first transmission coil and the second and third transmission coils is 50% or more of an entire area of the first transmission coil.

7. The wireless power transmitter according to claim 6, wherein the overlapping area between the first transmission coil and the second and third transmission coils is 90% or more of the entire area of the first transmission coil.

8. The wireless power transmitter according to claim 5, wherein the connector is located closest to the first transmission coil, among the first transmission coil, the second transmission coil and the third transmission coil.

9. The wireless power transmitter according to claim 1, wherein each of the first, second and third transmission coils is connected to two switches among a plurality of switches, and
   wherein the plurality of switches are disposed between a signal generator and the first, second and third transmission coils.

10. A wireless power transmitter comprising:
    a first layer including a first transmission coil;
    a second layer including a second transmission coil and a third transmission coil;
    a Printed Circuit Board (PCB) having a first surface and a second surface attached to the first layer and the second layer, respectively;
    a control circuit board for controlling wireless power transfer through the first, second and third transmission coils; and
    a connector inserted into the PCB, the connector electrically connecting the first, second and third transmission coils to the control circuit board,
    wherein the connector is located closer to the first transmission coil than the second and third transmission coils.

11. The wireless power transmitter according to claim 10, wherein the first transmission coil included in the first layer and the second transmission coil included in the second layer overlap each other.

12. The wireless power transmitter according to claim 10, wherein the first, second and third transmission coils are formed by symmetrically etching both surfaces of a copper plate, and
    wherein each of the first to third transmission coils is thicker than the PCB.

13. The wireless power transmitter according to claim 10, wherein the first surface is a surface facing an interface surface on which a wireless power receiver is placed, and
wherein the second surface is a surface at an opposite side of the interface surface.

14. The wireless power transmitter according to claim 10, wherein the first surface is a surface at an opposite side of an interface surface on which a wireless power receiver is placed, and
wherein the second surface is a surface facing the interface surface.

15. The wireless power transmitter according to claim 10, wherein an overlapping area between the first transmission coil and the second and third transmission coils is 50% or more of an entire area of the first transmission coil.

16. The wireless power transmitter according to claim 15, wherein the overlapping area between the first transmission coil and the second and third transmission coils is 90% or more of the entire area of the first transmission coil.

17. The wireless power transmitter according to claim 10, wherein the second transmission coil and the third transmission coil are spaced apart from each other.

18. A wireless power transmitter comprising:
a Printed Circuit Board (PCB);
a first transmission coil disposed on a first surface of the PCB;
a second transmission coil and a third transmission coil, each disposed on a second surface of the PCB opposite to the first surface, both of the second and third transmission coils overlapping with the first transmission coil; and
a control circuit board for controlling wireless power transfer through the first to third transmission coils,
wherein the control circuit board is configured to:
individually select a best aligned coil among the first, second and third transmission coils for transmitting wireless power, and
control the best aligned coil to transmit the wireless power without transmitting the wireless power via two unselected coils among the first, second and third transmission coils.

19. The wireless power transmitter according to claim 18, wherein each of the first to third transmission coils is formed by symmetrically etching both surfaces of a copper plate, and
wherein each of the first to third transmission coils is thicker than the PCB.

* * * * *